United States Patent
Wesley et al.

(10) Patent No.: US 10,379,881 B2
(45) Date of Patent: Aug. 13, 2019

(54) DELIVERING AN IMMERSIVE REMOTE DESKTOP

(71) Applicant: Citrix Systems, Inc., Fort Lauderdale, FL (US)

(72) Inventors: Ian R. Wesley, Parkland, FL (US); Lin Cao, Boca Raton, FL (US); Rakesh Kumar, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 277 days.

(21) Appl. No.: 15/352,748

(22) Filed: Nov. 16, 2016

(65) Prior Publication Data
US 2018/0136948 A1    May 17, 2018

(51) Int. Cl.
| | |
|---|---|
| *G06F 3/0481* | (2013.01) |
| *G06F 9/451* | (2018.01) |
| *G06F 3/0484* | (2013.01) |
| *G06F 8/38* | (2018.01) |
| *H04L 29/06* | (2006.01) |

(52) U.S. Cl.
CPC .......... *G06F 9/452* (2018.02); *G06F 3/04815* (2013.01); *G06F 3/04845* (2013.01); *G06F 8/38* (2013.01); *H04L 65/1069* (2013.01)

(58) Field of Classification Search
CPC ............. G06F 3/04815; G06F 3/04845; G06F 9/4445; G06F 9/452
See application file for complete search history.

(56) References Cited

U.S. PATENT DOCUMENTS

| | | | | | |
|---|---|---|---|---|---|
| 5,502,481 | A  | * | 3/1996 | Dentinger | G02B 27/0093 348/51 |
| 8,589,822 | B2 | * | 11/2013 | Bell | G02B 27/2228 715/801 |
| 8,786,673 | B2 | * | 7/2014 | Cheng | G06T 3/0012 348/43 |
| 2002/0176636 | A1 | * | 11/2002 | Shefi | G06T 11/206 382/285 |
| 2007/0244987 | A1 | * | 10/2007 | Pedersen | H04L 63/0272 709/217 |
| 2008/0247636 | A1 | * | 10/2008 | Davis | G06T 19/00 382/152 |
| 2010/0328306 | A1 | * | 12/2010 | Chau | G02B 27/2214 345/419 |
| 2012/0062558 | A1 | * | 3/2012 | Lee | G06F 3/017 345/419 |
| 2017/0336941 | A1 | * | 11/2017 | Gribetz | G06F 3/04815 |

* cited by examiner

*Primary Examiner* — William L Bashore
*Assistant Examiner* — Gregory A Distefano
(74) *Attorney, Agent, or Firm* — Fox Rothschild LLP; Robert J. Sacco; Carol E. Thorstad-Forsyth (57) ABSTRACT

Method for delivering an immersive remote desktop involves a client server session involving a server computer and a client computer. The server computer accesses image data representative of at least one of an application window and a desktop associated with a graphical user interface (GUI). The image data is used to generate one or more stereoscopic image pairs. The client computer incorporates the one or more stereoscopic image pairs in a 3D composite presentation in which one or more of the stereoscopic image pairs are displayed in side-by-side (SBS) configuration to create a 3D visual effect.

18 Claims, 7 Drawing Sheets

DELIVERING AN IMMERSIVE REMOTE DESKTOP

BACKGROUND

Statement of the Technical Field

The technical field of this disclosure concerns cloud hosted computing, and more particularly concerns methods and systems for implementing connectivity between cloud hosted computing systems and on-premises enterprise resources.

Description of the Related Art

Certain types of operating provide access to one or more applications using a window. Each window conventionally comprises a separate viewing area within a two-dimensional (2D) display screen. These types of operating systems allow a plurality of such window viewing areas which are presented to the user as part of graphical user interface. Further, these operating systems commonly include a window manager. The window manager is a software component of the operating system that is responsible for compositing windows from various software applications into a final image that is displayed to the user on a display screen.

Desktop Window Manager (DWM) is the window manager provided in certain well known operating systems offered by Microsoft Corporation, such as Windows 10. The DWM in such operating systems enables the use of hardware acceleration to render the graphical user interface. DWM is configured as a compositing window manager, whereby each software application can write data to an off-screen buffer, after which DWM will generate a final image that is a composite including the buffered data from each application program. Since the off-screen buffer is continuously updated by each software application, the composite generated by the DWM is a dynamic representation of the application window and not a static rendering. DWM is a core operating system component which is started before the user logon and remains active for the duration of a session.

Window managers can allow windows to be presented to a user in a manner which allows them to overlap on the display screen. The order in which the windows are to be stacked is called their z-order. The z-order usually begins with the desktop and continues with each window being presented from back to front. Since a compositing desktop manager (such as DWM) has access to the graphics from all of the application programs, it can facilitate certain visual effects relating to the presentation of one or more windows.

A virtual machine client agent is an application that allows a user a type of virtualized remote access to corporate applications, desktops and data. Each client agent may communicate with a central enterprise server that lists which applications and other resources have been selected by the user, and which applications and other resources are available for the user to select or request.

SUMMARY

Embodiments concern methods for delivering an immersive remote desktop. The methods involve a client server session including a server computer and a client computer. The server computer accesses image data representative of at least one of an application window and a desktop associated with a graphical user interface (GUI). The image data is used to generate one or more stereoscopic image pairs. The client computer incorporates the one or more stereoscopic image pairs in a 3D composite presentation in which one or more of the stereoscopic image pairs are displayed in side-by-side (SBS) configuration to create a 3D visual effect. The 3D composite presentation includes stereoscopic image pairs comprising at least one of the application window and the desktop.

Embodiments also concern a method for delivering an immersive remote desktop, which involves a Windows presentation client server session. A server computer accesses image data representative of at least one of an application window and a desktop associated with a graphical user interface (GUI). The image data is communicated to the client computer using a Windows presentation services protocol. Thereafter, the image data is used to generate one or more stereoscopic image pairs at the client computer. The client computer is operated so as to incorporate the one or more stereoscopic image pairs in a 3D composite presentation in which one or more of the stereoscopic image pairs are displayed in side-by-side (SBS) configuration to create a 3D visual effect. The 3D composite presentation includes stereoscopic image pairs comprising at least one of an application window and the desktop.

The method also concerns a method for delivering an immersive remote desktop, in a Windows presentation client server session, wherein at least a first application window is instantiated by using 3D modeling software. In such software 3D models are used to represent one or more physical bodies using a collection of points in 3D space, and connected by various geometric entities such as triangles. The 3D processing components in the client computer are used to render views of the same subject matter (e.g., the same physical body represented by the 3D model) from two different viewing angles. The two rendered views are then used to form a stereoscopic image pair at the server computer. Thereafter, the stereoscopic image pair is communicated to the client computer. The client computer is operated to incorporate the stereoscopic image pair in a 3D composite presentation in which the stereoscopic image pair is displayed in side-by-side (SBS) configuration to create a 3D visual effect.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Embodiments disclosed herein facilitate the delivery of a three-dimensional (3D) immersive virtual reality experience for windows desktops and applications, including remoted windows desktops and applications. Conventional 3D capable hardware (e.g., Google cardboard, Samsung Gear VR, Occulus Rift) is leveraged by using information from a window manager to facilitate presentation of side by side (SBS) 3D imagery whereby users can experience a full 3D virtual reality (VR) experience in user space. More particularly, methods are disclosed herein for creating stereoscopic imagery of one or more windows comprising a two-dimensional (2D) desktop, which can then be presented in a virtual 3D space. Alternatively, the stereoscopic imagery comprising one or more application windows can be presented against a backdrop comprising a live direct view of a real-world environment.

Embodiments disclosed herein utilize information and data that is available to operating system components (e.g., a windows manager in a conventional windows operating system) to facilitate presentation of a 3D viewing experience based on the available 2D application imagery provided from each application. More particularly, window display data available to the windows manager for 2D user desktop display is used to generate SBS imagery for use in the 3D presentation. Notably, this permits the user desktop to be seamlessly composed for 3D display while maintaining a conventional display of the same windows on the user desktop.

Figure 1:
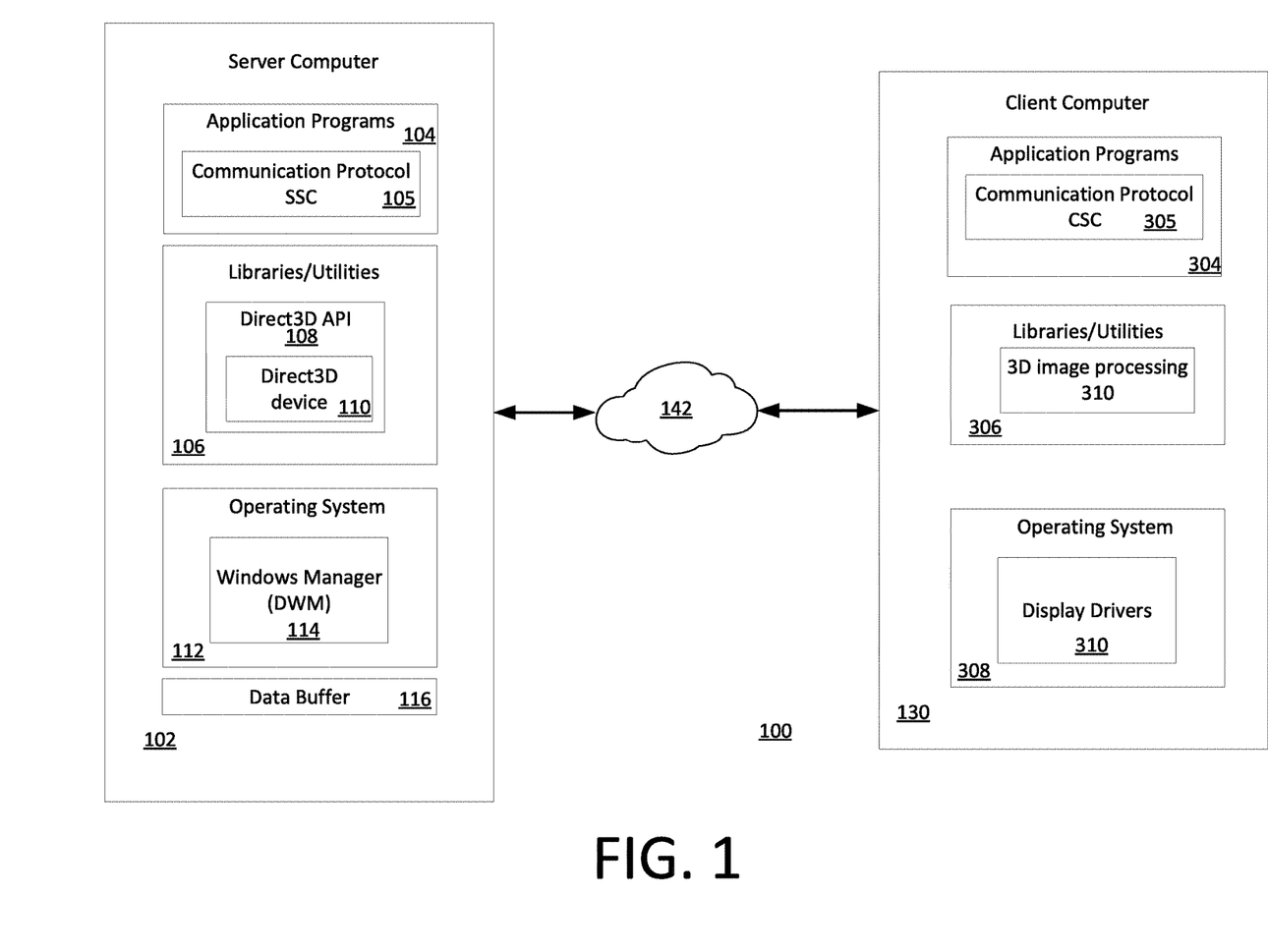
FIG. 1 is a block diagram of a system comprising a client and server computer which is useful for understanding an embodiment.

Referring now to FIG. 1 there is shown a client/server computing system 100 which includes server computer 102 and client computer 130. The server computer 102 includes one or more application programs 104, an operating system 112 and certain software libraries/utilities 106. The operating system includes a windows manager 114.

Server computer 102 communicates with client computer 130 which may be a pocket computer and/or smartphone. As shown in FIG. 1, the client computer 130 can comprise a computer operating system 308, display drivers 310, application programs 304 and software libraries/utilities 306.

In some scenarios, the client computer 130 can be directly connected to the server computer 102 by a local wired or wireless data connection. But in certain embodiments disclosed herein, the client computer is remote from the server computer 102 and communicates through a computer data network 142. In such a scenario, a suitable network communication protocol can be used to pass data between the server computer 102 and client computer 130.

In some embodiments, a Windows presentation services protocol is used whereby application logic associated with one or more application programs executes on server computer 102. Windows presentations systems are known in the art and therefore will not be described here in detail. However, it will be appreciated that in such a scenario, the client computer 130 does not perform any processing directly associated with the application software logic. Instead logic processing associated with one or more applications is performed exclusively at the server computer. The communication protocol communicates information concerning user inputs and screen updates between the server computer 102 and the client computer 130 while utilizing minimal bandwidth. An example of such an arrangement is the Independent Computing Architecture (ICA) developed by Citrix Corporation.

In an embodiment, the operating system 112 provided in server computer 102 can be one of the Windows family of operating systems available from Microsoft Corporation (e.g. Windows 10). Further, the windows manager 114 can be a Desktop Window Manager (DWM) that is conventionally used in Windows 10 and other Windows based operating systems. As is known, DWM is a compositing window manager, such that each application program 104 executing on said operating system 112 will have a data buffer 116 to which it writes data (display data). The DWM will then form a composite display using the display data from each application program and will form a composite 2D display image to be displayed onscreen to a user. In a conventional system, these bitmapped images are used to facilitate a 2D display on a conventional display screen based on the z-order of the windows.

DWM uses a graphics application programming interface (API) called Direct3D to render its operating system desktop. The term "desktop" as used herein refers the main screen display used in a Windows operating environment from which one or more applications can be launched and run in individual application windows. As is known, images, icons, and other elements of a graphical user interface (GUI) are commonly displayed as part of the desktop in a Windows environment. Similarly, one or more windows associated with one or more software application are conventionally displayed on a display screen with the desktop as a background or backdrop.

The Direct3D API 108 utilizes rendering components which are referred to as Direct3D devices 110. As is known, a Direct3D device will conventionally encapsulate and store the rendering state, perform transformations and lighting operations, and rasterize an image to a surface. A Direct3D device 110 that is responsible for composing the desktop within DWM will be hooked to the DWM. This Direct3D device would therefore have access to texture of windows bitmaps belonging to different applications, which can be copied to system memory from within DWM.exe.

Advantageously, a hooked Direct3D device interface from the DWM can provide access to a full size bitmap image of each of the application windows running in the operating system 112. These full sized bitmap images for each window can be used to facilitate a 3D composition as described below. The 3D composition can be based on either the z-order of the windows specified by the DWM or some other user defined ordering (e.g. the ordering may be based on user interaction with these applications).

In a first embodiment, the full size bitmap image of each application window obtained from DWM is communicated from the server computer 102 to the client computer 130. Once received, the full-sized bitmap image is rasterized to a pair of oblique surfaces to create a stereoscopic image pair. In such scenarios, 3D capable hardware and/or software processing elements in the client computer 130 (e.g. 3D image processing 310) can facilitate generation of the stereoscopic image pairs necessary to create a 3D effect.

Figure 2A:
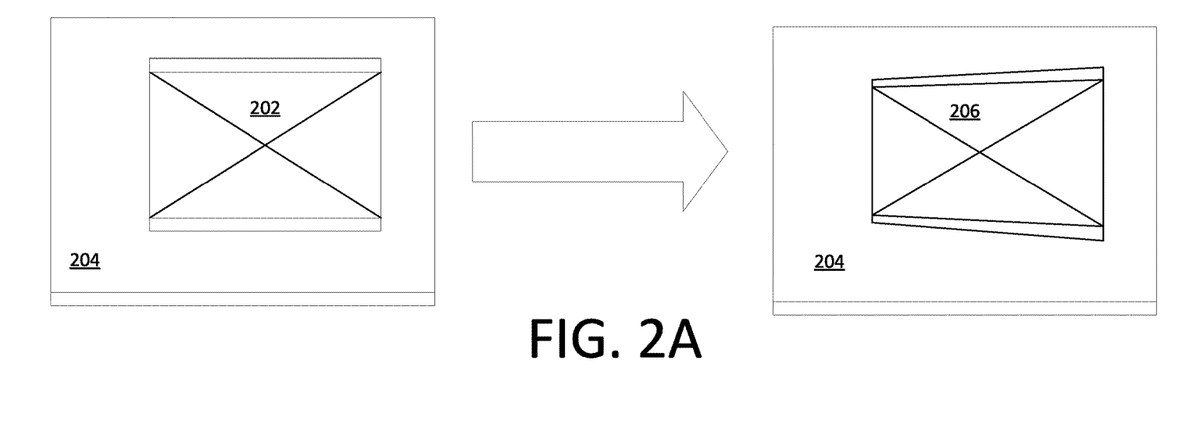
FIGS. 2A and 2B comprise notional diagrams that are useful for understanding a manner in which stereoscopic image pairs are created.
Figure 2B:
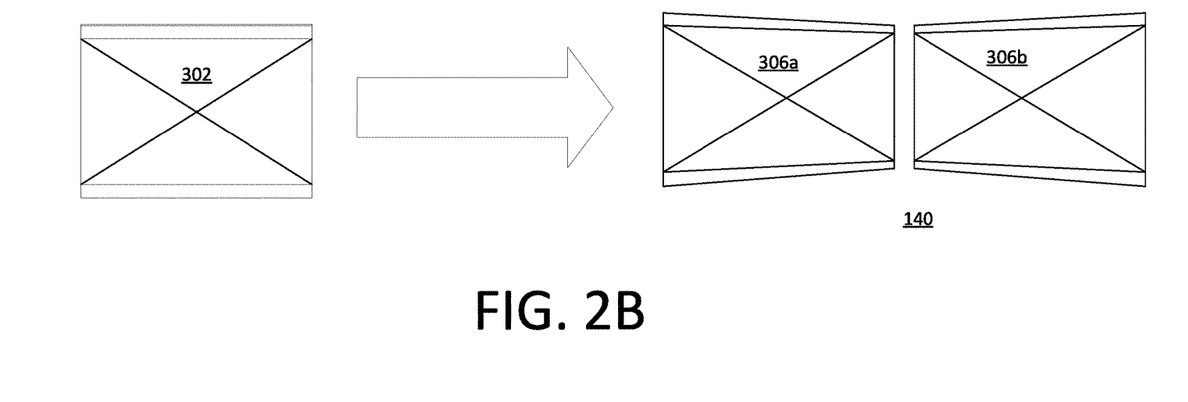

This concept is illustrated in FIG. 2A which shows that the 3D image processing elements in the client device can rasterize a full-sized bitmap image 202 of a particular application window to a surface so as to form an oblique view 206 of the full-sized bitmap image 202. In an embodiment disclosed herein, the 3D image processing element(s) can be commanded to generate two views 306a, 306b of the same application window 302 at slightly different oblique viewing angles as shown in FIG. 2B. If the angles of the two oblique views 306a, 306b are properly selected, then the two views can be used to as a pair of stereoscopic images for SBS 3D viewers.

As is known, the illusion of 3D can be created from a pair of 2D images by presenting in each 2D image a slightly different view of an object. This illusion is caused by the fact that humans observe the world through two eyes that are approximately three inches apart. Consequently, each eye sees objects in the real world from a slightly different perspective. In stereoscopic image pairs, the two images are combined by the brain of the person who is viewing the images so as to give the perception of depth. So in an embodiment disclosed herein, the 3D image processing element(s) 310 in the client device can be commanded to generate two full-sized bitmaps (e.g. 306a, 306b) comprising a stereoscopic image pair 140. The two full-sized bitmaps 306a, 306b are of the same window 302 at two slightly different oblique angles as would be perceived by a person's two eyes when viewing the same application window on a conventional display screen.

In an alternative embodiment, the Direct3D device 110 in the server computer 102 can be commanded to generate the two full-sized bitmaps (e.g. 306a, 306b) comprising a stereoscopic image pair 140. Image data comprising the stereoscopic image pair could then be communicated from the server computer 102 to the client computer 130. In that case, the burden associated with the 3D image rendering could be handled by the server computer 102 instead of the client computer 130.

In another alternative embodiment, a software application executing on the server computer 102 can comprise 3D modeling software. With such 3D modeling software one or more 3D model are used to represent one or more physical bodies in a scene which is rendered for display on a screen. The 3D model is usually comprised of a collection of points in 3D space, and connected by various geometric entities such as triangles, lines, or curved surfaces. Examples of such 3D modeling software can be found in computer aided design (CAD) software, medical imaging software applications, video game software, and so on.

In 3D modeling software as described herein, 3D processing components in the client computer are used to facilitate the rendering of 3D models for display on a screen. However, in an embodiment disclosed herein a hooked Direct3D device interface can facilitate rendering of two views of the same subject matter (e.g., the same physical body represented by the 3D model) from two different oblique viewing angles. The two rendered views are then used to form a stereoscopic image pair at the server computer. For example, in the case of a computer aided design (CAD) program a hooked Direct3D device can facilitate the ability to generate first and second views of the same physical body represented by the 3D model from two different viewing angles. Similarly, a hooked Direct3D device used in conjunction with an immersive computer gaming application which includes 3D models can facilitate rendering of two views of the same scene from different viewing directions. For these types of applications, a hooked Direct3D device can render first and second views of the same subject matter from different oblique angles to comprise a stereoscopic image pair. Once generated, the stereoscopic image pair could be communicated to the client computer 130.

In some scenarios, multiple bitmap images representing two or more different application windows and/or a computer desktop can be communicated to the Client computer 130. Images corresponding to each application window can be continuously updated by the server computer 102, and communicated to the client computer 130. In scenarios where the stereoscopic image pair was generated at the server computer 102, the two images comprising the image pair would be continuously updated and communicated to the client computer.

Figure 3:
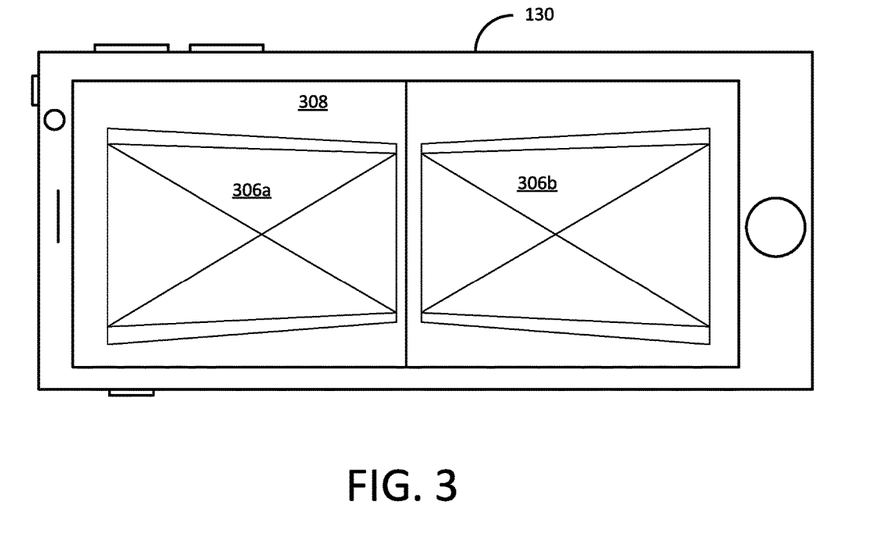
FIG. 3 is diagram that is useful for understanding how stereoscopic image pairs can be displayed in a client device.

The client computer 130 can be used in conjunction with or as part of a conventional SBS VR headset (e.g., Google cardboard, Samsung Gear VR, Occulus Rift) where the stereoscopic images are rendered separately to each eye. Stereoscopic viewing devices of this type are well known and therefore will not be described here in detail. Of course, other types of stereoscopic capable end point client systems are also possible, provided that they are similarly capable of rendering the images for each eye. As explained below in further detail, the one or more sets of stereoscopic images could facilitate the appearance of a virtual 2D large format display and/or multiple monitors/contexts which are viewable through the stereoscopic capable end point. The concept is illustrated in FIG. 3 which shows images 306a, 306b displayed in SBS format on a screen 310 associated with client computer 130.

Figure 4:
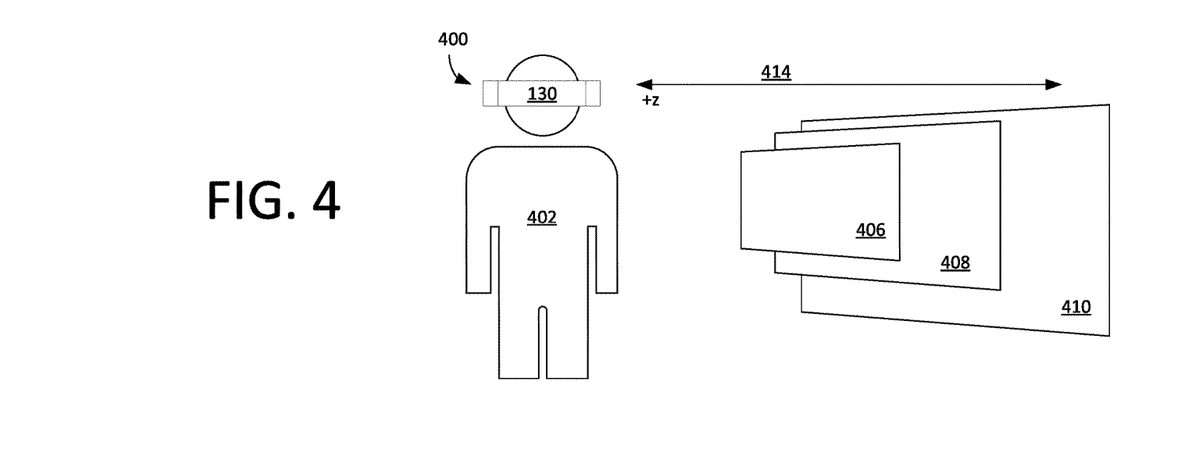
FIG. 4 is a diagram that is useful for understanding how a plurality of application windows and a computer desktop can form a 3D composite presentation which creates the illusion that the windows and computer desktop are located at different distances from a user.

The client computer 130 can be used to facilitate a 3D presentation of a complete 2D desktop comprised of multiple windows. This concept is shown in FIG. 4 wherein a user 402 wears an SBS VR headset 400 comprised of a client computer 130. In the exemplary embodiment of FIG. 4, the user would observe one or more application windows 406, 408 presented against a backdrop of the window desktop 410. The application windows 406, 408 would be rendered in 3D in accordance with their desktop z-order as shown. By moving forward or in reverse as indicated by arrow 414 (and as detected by an SBS client 130), the user could traverse through this 3D desktop world as though walking through different 3D planes of the desktop. The z-order could begin with the desktop appearing to be positioned furthest from the user and continue with each application window being presented from back to front as shown. The areas surrounding the application windows 406, 408 and windows desktop image 410 could be filled in with a solid color, or a stored image.

Further, the content of one or more application window (e.g., application window 406, 408) could be respectively using generated different methods as described above. For example, a stereoscopic image pair used in the 3D composition to form a first application window 406 could be rendered at the client device 130, based on a bitmap image from the server 102. Concurrently, a second stereoscopic image pair used in the 3D composition to form a second application window could be rendered at the server 102. In some scenarios involving 3D modeling software executing at the server, the second stereoscopic image pair could be rendered by available 3D processing components present in the server which facilitate rendering of two views of the same 3D model subject matter from different oblique angles.

Figure 5:
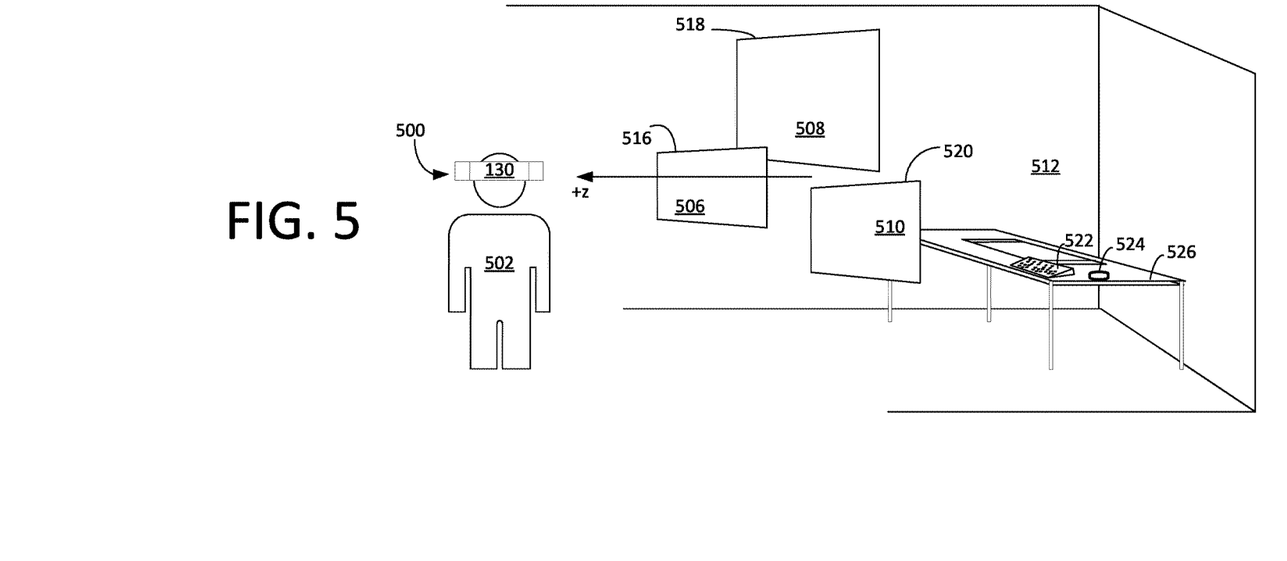
FIG. 5 is a diagram that is useful for understanding how a plurality of application windows and a computer desktop can form a 3D composite presentation which is displayed to a user with a background comprised of real world imagery.

According to another aspect shown in FIG. 5, the stereoscopic imagery comprising the windows desktop 510 and/or application windows images 506, 508 could be composed with real time images of the real physical space 512 which exists around a user 502 to achieve an augmented reality (AR) experience. The real time images in such a scenario would be captured by a camera (e.g. a video camera) associated with the client computer 130 comprising the SBS VR headset 500. 3D capable hardware and/or software processing elements 310 in the client computer 130 can facilitate generation of stereoscopic image pairs as described above to create a 3D effect by rasterizing and displaying of the captured imagery.

In such a scenario, the user will experience the 3D desktop 510 and one or more application windows 506, 508 as though displayed in a background comprising live video of the real world as captured by the camera. The live video could be displayed continuously or only during periods of time when the user needs to interact with real world devices in the room (e.g. a keyboard or mouse). So in FIG. 5, the user would be able to see keyboard 522, mouse 524, desk 526 and other physical attributes of the real physical space 512 comprising an environment. In some scenarios, one or more application windows 506, 508 can be displayed to a user in different virtual monitors 516, 518, 520 which appear to exist at different physical locations in the real world video imagery captured by the camera.

According to one aspect, the client computer 130 can manage position and depth of each individual application window in 3D space to facilitate a VR experience. For example, accelerometers in the client computer 130 can be used to detect a head position so that when a user's head is oriented in one direction (e.g., user turns head to the right) the user 502 will be presented with stereoscopic imagery of desktop 510 in the SBS VR device 500. But when the user's head is turned or oriented in a different direction (e.g. turned to the left) the client computer can cause the user to be presented with stereoscopic imagery of the application window 506 in the SBS stereoscopic view. If the user's head is turned or oriented in a third direction (e.g. upwardly in FIG. 5), then the client device could cause stereoscopic imagery of the application window 508 to be displayed in the client computer. If the user moves toward or away from an apparent position of one of the application windows 506, 508 or desktop 510 the screen 516, 518, 520 can appear to grow larger or smaller as appropriate.

In each case, the windows desktop 510 and/or application windows images 506, 508 could be composed or composited in the client computer 130 with real time images of the real physical space 512 around or in front of the user to achieve an augmented reality (AR) experience. The client computer 130 can also manage transitions between the two application windows such that intermediate head positions can result in portions of the first and second application window being displayed concurrently.

From the foregoing it will be understood that one or more stereoscopic image pairs 140 can be continuously generated in the client computer 130 or the server computer 102. However, other actions and operations associated with managing and controlling the stereoscopic image pairs to create the illusion of the 3D space are advantageously handled at the client computer. For example, client computer 130 can generate and display video image pairs of real physical space 512 as captured by an integrated camera. It can also create and display in SBS format a composite image in which the stereoscopic image pairs 140 are overlaid on the background image of the real physical space 512 as captured by the camera. Position and z order of the various application windows and desktop can be managed by client computer 130. Suitable hand or head gestures captured by the camera or onboard accelerometers could be used by client computer 130 to adjust the position of windows desktop 510 and/or application windows images 506, 508 within the 3D composition. For example, client computer 130 can use a suitable API (e.g. open source APIs from OpenCV) to track hand and fingers location and detect gestures from the images captured by the camera in real time. Of course, the embodiments disclosed herein are not limited in this regard and any other suitable method can be used for detecting and interpreting such hand gestures.

Any suitable method can be used for communicating image data from server computer 102 to the client computer 130. However, an optimized protocol is advantageously utilized in scenarios where the client computer 130 is remote from server computer 102 so as to deliver bitmaps to the user device with reduced bandwidth and/or improved image quality. For example, in scenarios where the stereoscopic image pairs are generated at the server 102, the stereoscopic image pairs 140 are almost identical, but will have small difference corresponding to the oblique angle at which they are presented. Accordingly, a video data compression algorithm could be used to identify the duplicated information present in the image pair and identify differences. In such scenarios, both of the bitmap SBS images can be encoded separately; the left SBS image bitmap will be encoded as full frame and right SBS image bitmap will only be encoded with the difference relative to the left image. This technique could greatly reduce the amount of image data to be communicated to the client computer 130. Once the compressed image data is received at SBS 130, the two SBS image bitmaps will be recreated and displayed. An optimized protocol can also merge two images from SBS into a single image before it can compress it for reduced bandwidth, and then recreate two images for SBS on the end point. The bandwidth saved by utilizing these techniques could facilitate communication of higher quality images by adjusting encoder settings.

Further, in scenarios where the client computer 130 is remote from server computer 102, the image data can be communicated to the client computer using a suitable remoting protocol. An example of such a protocol can include the well-known Independent Computing Architecture (ICA), which is a proprietary Windows presentation protocol designed by Citrix Systems. As is known, the ICA protocol lays down a specification for passing data between server and clients, but is not bound to any one platform. Accordingly, the client computer 130 need not have a Windows-based operating system.

ICA also provides for the feedback of user input from the client to the server, and a variety of means for the server to send graphical output, as well as other media such as audio, from the running application to the client. To facilitate the foregoing, the communication protocol can include a communication protocol server software component (SSC) 105 which would be installed in the server computer 102, and a client software component (CSC) 305 which would be installed in the client computer 130. Still, the embodiments disclosed herein do not require the use of ICA or any other specific protocol.

Figure 6A:
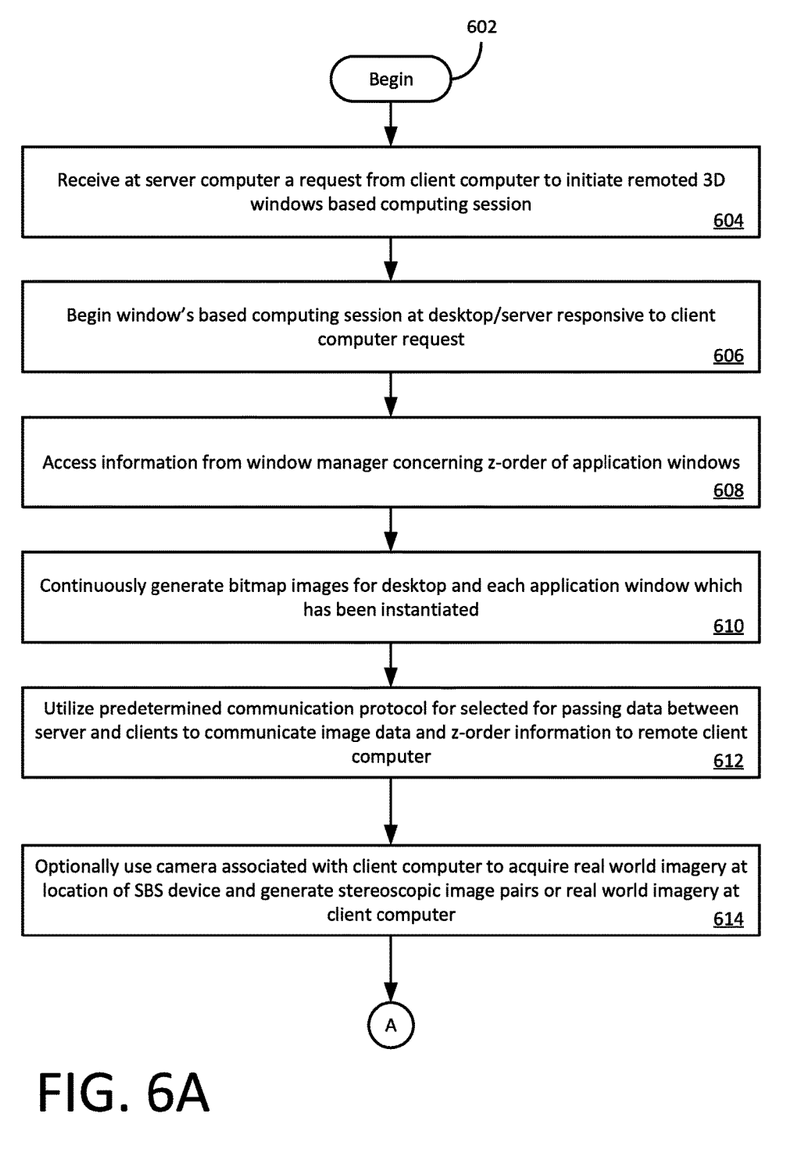
FIGS. 6A and 6B is a flowchart that is useful for understanding an embodiment method disclosed herein.
Figure 6B:
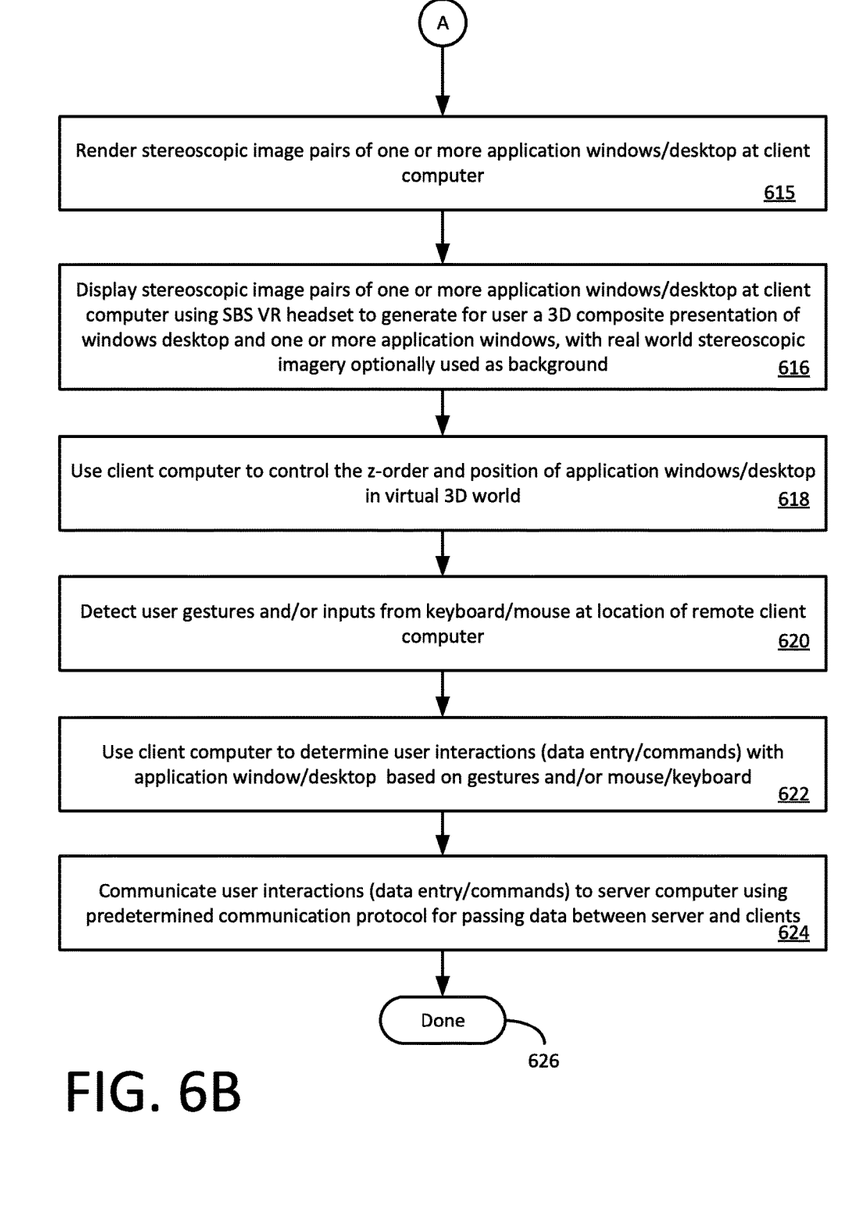

Turning now to FIGS. 6A and 6B, there is a flowchart that is useful for understanding the various embodiments described herein. The process begins at 602 and continues to 604 where a server computer 102 receives a request from client computer 130 to initiate a remoted 3D windows based computing session. The session can be conducted in accordance with a windows presentation services protocol such as ICA which defines a specification for passing data between servers and clients. In response, the server computer 102 will begin a Windows based computing session at 606. Once the session begins, the window manager 114 will access information concerning the z-order of application windows in 608. The windows manager will also generate and continuously update at 610 for the windows desktop and each application window a bitmap image. The bitmap image data and the z-order information will be communicated at 612 to the client computer 130 utilizing a predetermined communication protocol which has been defined for application server system in use. In embodiments where a stereoscopic image pair is rendered by the server 102 rather than the client computer 130, the windows manager can generate a stereoscopic image pair as described herein.

At the client computer, an integrated camera is optionally used at 614 to acquire real world imagery at the location of the client computer. In such scenarios, 3D processing components provided in the client device can use the acquired video images to generate stereoscopic image pairs of real world imagery. The process then continues on to step 615 where the client computer 130 can render stereoscopic image pairs of the one or more application windows and/or desktop. In embodiments where the stereoscopic image pair is rendered by the server 102, this step can be omitted.

At 616, the stereoscopic image pairs of one or more application windows/desktop are displayed at client computer using a suitable SBS VR headset. The stereoscopic image pairs are used to generate for the user a 3D composite presentation comprising the windows desktop and one or more application windows as described above. Real world stereoscopic imagery is optionally used as background to the window/desktop images.

The process continues in 618 the client computer is used to control the z-order and position of application windows/desktop in virtual 3D world displayed for the user. For example, this can involve detecting 620 user gestures and/or inputs from keyboard/mouse at the location of the client computer. The client computer determines at 622 the desired user interactions (data entry/commands) with application window/desktop based on the user gestures and/or mouse/keyboard inputs. The process then continues on to 624 where the client computer communicates the user interactions (data entry/commands) to the server computer using the predetermined communication protocol. Thereafter further processing can be performed at 624 or the process can terminate at 626.

Figure 7:
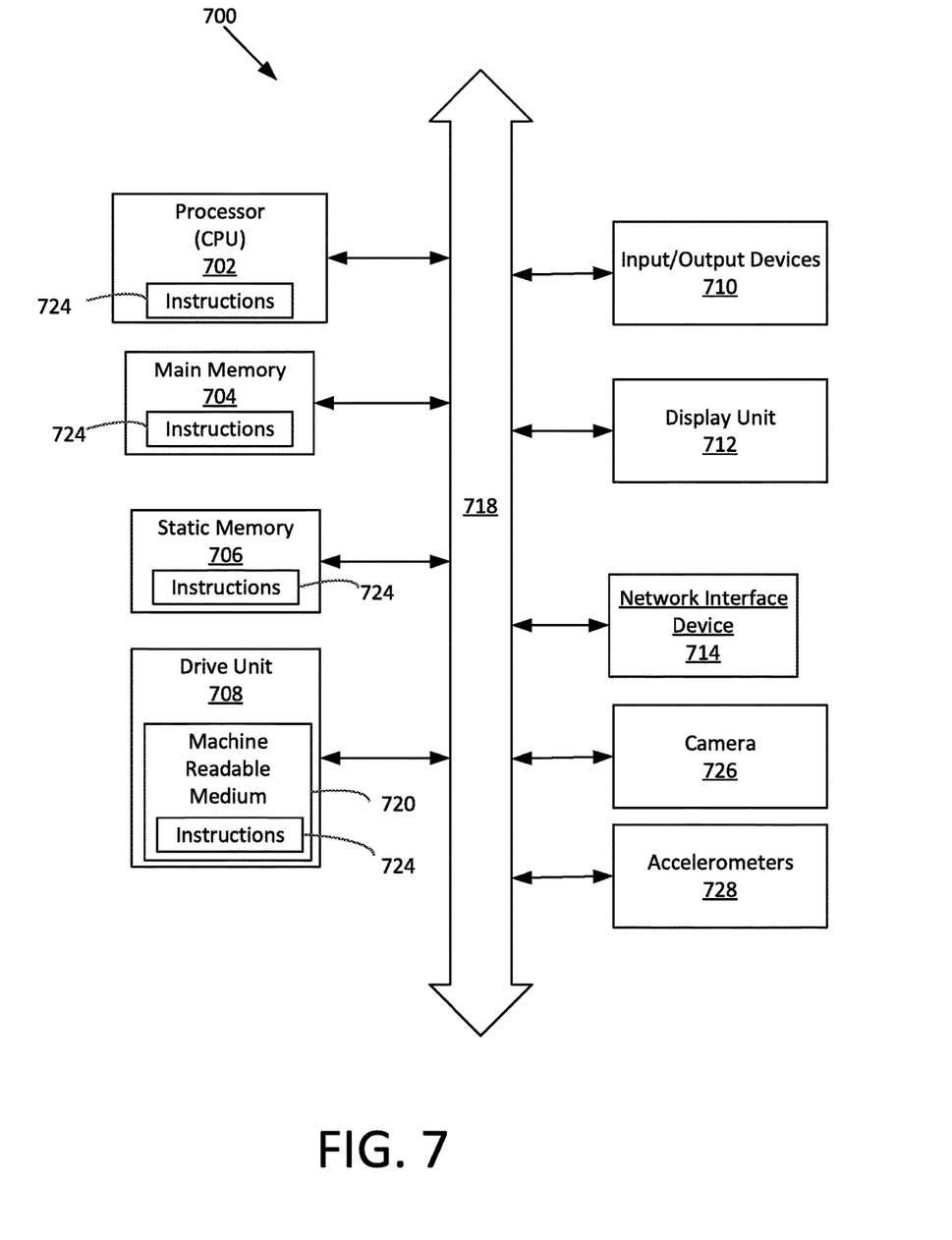
FIG. 7 is a hardware block diagram which is useful for understanding certain features of a server computer and/or a client computer.

Referring now to FIG. 7, there is shown a hardware block diagram comprising an exemplary computer system 700. The machine can include a set of instructions which are used to cause the computer system to perform any one or more of the methodologies discussed herein. As such, the machine can function as a server or a client device. In one or more embodiments, the exemplary computer system 700 can correspond to each of the computer systems that are used to implement server computer 102 and/or client computer 130. In some embodiments, the computer 700 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The computer system 700 is comprised of a processor 702 (e.g. a central processing unit or CPU), a main memory 704, a static memory 706, a drive unit 708 for mass data storage and comprised of machine readable media 720, input/output devices 710, a display unit 712 (e.g. a liquid crystal display (LCD) or a solid state display, and a network interface device 714. The computer system 700 can also include a camera 726 (e.g. a video camera) for capturing images in a local environment and accelerometers 728 for detecting movement of the computer system 700. Communications among the various components comprising computer system 700 can be facilitated by means of a data bus 718.

One or more sets of instructions 724 can be stored completely or partially in one or more of the main memory 704, static memory 706, and drive unit 708. The instructions can also reside within the processor 702 during execution thereof by the computer system. The input/output devices 710 can include a keyboard, a mouse, a multi-touch surface (e.g. a touchscreen) and so on. The network interface device 714 can be comprised of hardware components and software or firmware to facilitate wired or wireless network data communications in accordance with a network communication protocol.

The drive unit 708 can comprise a machine readable medium 720 on which is stored one or more sets of instructions 724 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 700 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for delivering an immersive remote desktop, comprising:
   initiating a client server session involving a server computer and a client computer;
   accessing in the server computer image data representative of at least one of an application window and a desktop associated with a graphical user interface (GUI);
   using the image data to generate one or more stereoscopic image pairs, each said stereoscopic image pair comprising two images having isosceles trapezoid shapes and showing two views of a same said application window or desktop at different oblique viewing angles;
   operating the client computer to incorporate the one or more stereoscopic image pairs in a 3D composite presentation in which one or more of the stereoscopic image pairs are displayed in side-by-side (SBS) configuration to create a 3D visual effect;
   wherein the 3D composite presentation includes stereoscopic image pairs comprising at least one of the application window and the desktop.

2. The method according to claim 1, wherein an application associated with the application window and an operating system associated with the GUI is executing exclusively on the server computer.

3. The method according to claim 1, wherein the 3D composite presentation is comprised of a plurality of stereoscopic image pairs comprising at least one application window and the computer desktop.

4. The method according to claim 3, wherein the plurality of stereoscopic image pairs are arranged by the client computer in the 3D composite presentation to create a 3D visual effect in which at least one of the plurality of application windows and the computer desktop appear to be displayed at different distances from the user to define a z-order along a z-axis.

5. The method according to claim 4, wherein the client computer is responsive to at least one user input to control the z-order within the 3D composite presentation.

6. The method according to claim 3, further comprising capturing with a camera video imagery and displaying the video imagery as part of the 3D composite presentation.

7. The method according to claim 6, wherein the 3D composite presentation is configured to present the video imagery as background to the plurality of application windows and computer desktop displayed as part of the 3D composite presentation.

8. The method according to claim 7, wherein the video imagery is live imagery from an environment in which the client computer is located.

9. The method according to claim 4, wherein the 3D composite presentation is configured to create a 3D visual effect for the user whereby the plurality of application windows and the desktop appear to be displayed at locations which vary in directions orthogonal to the z-axis.

10. The method according to claim 1, further comprising communicating the image data from the server computer to the client computer.

11. The method according to claim 10, further comprising generating the one or more stereoscopic image pairs at the client computer based on the image data.

12. The method according to claim 1, further comprising instantiating at least a first application window using a 3D modeling type of software application comprised of one or more 3D models which are used to render a displayed image in 2D.

13. The method according to claim 12, further comprising using the one or more 3D models and 3D processing components in the server computer to form a first stereoscopic image pair at the server computer before communicating the first stereoscopic image pair to the client computer.

14. The method according to claim 13, further comprising generating at least a second stereoscopic image pair associated with a second application window.

15. The method according to claim 14, further comprising generating the second stereoscopic image pair at the client computer.

16. The method according to claim 15, further comprising including in the 3D composite presentation the first and second stereoscopic image pair.

17. A method for delivering an immersive remote desktop, comprising:
   initiating a Windows presentation client server session involving a server computer and a client computer;
   accessing in the server computer image data representative of at least one of an application window and a desktop associated with a graphical user interface (GUI);
   communicating the image data to the client computer using a Windows presentation services protocol;
   using the image data to generate one or more stereoscopic image pairs at the client computer, each said stereoscopic image pair comprising two images having isosceles trapezoid shapes and showing two views of a same said application window or desktop at different oblique viewing angles;
   operating the client computer to incorporate the one or more stereoscopic image pairs in a 3D composite presentation in which one or more of the stereoscopic image pairs are displayed in side-by-side (SBS) configuration to create a 3D visual effect;
   wherein the 3D composite presentation includes stereoscopic image pairs comprising at least one of an application window and the desktop.

18. A method for delivering an immersive remote desktop, comprising:
- initiating a Windows presentation client server session involving a server computer and a client computer;
- instantiating at least a first application window at the server computer using an application comprising a 3D modeling type of software which includes one or more 3D models which are used to render a displayed image in 2D;
- using a 3D processing component at the server computer to generate a stereoscopic image pair by rendering two images having isosceles trapezoid shapes and showing two views of the same physical body represented by the one or more 3D models from two different oblique viewing angles;
- communicating the stereoscopic image pair to the client computer;
- operating the client computer to incorporate the stereoscopic image pair in a 3D composite presentation in which the stereoscopic image pair is displayed in side-by-side (SBS) configuration to create a 3D visual effect.

\* \* \* \* \*